[11] 3,631,443

[72] Inventors Martin O. Halfhill;
Timothy W. Martin, both of San Jose, Calif.
[21] Appl. No. 842,942
[22] Filed July 18, 1969
[45] Patented Dec. 28, 1971
[73] Assignee Information Storage Systems, Inc.
Cupertino, Calif.

[54] UNSAFE VELOCITY DETECTION SYSTEM
4 Claims, 11 Drawing Figs.
[52] U.S. Cl. ........................................................ 340/263,
340/282
[51] Int. Cl. ........................................................ G08b 5/22
[50] Field of Search .......................................... 340/263,
268, 271, 282

[56] References Cited
UNITED STATES PATENTS

| | | | |
|---|---|---|---|
| 2,913,662 | 11/1959 | Hogan ........................... | 340/271 UX |
| 3,146,432 | 8/1964 | Johnson ........................ | 340/263 |
| 3,465,326 | 9/1969 | Weir et al. .................... | 340/263 |

*Primary Examiner*—John W. Caldwell
*Assistant Examiner*—Michael Slobasky
*Attorney*—Robert B. Crouch ABSTRACT: An unsafe velocity detection system for use with a servo-controlled actuator connected to a movable load, including a transducer for generating a signal indicating traverse by the load of a predetermined increment of the effective working area of the load, circuitry for developing a time-based signal from the traverse signal and means for comparing the traverse signal with the time-based signal to detect any excessive velocity condition.

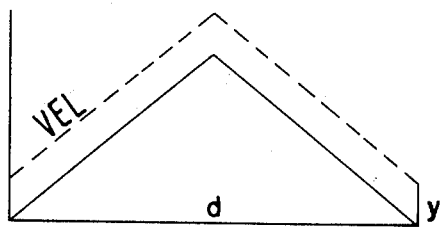
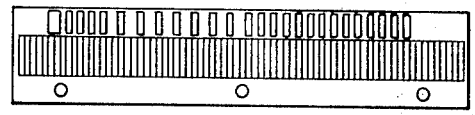
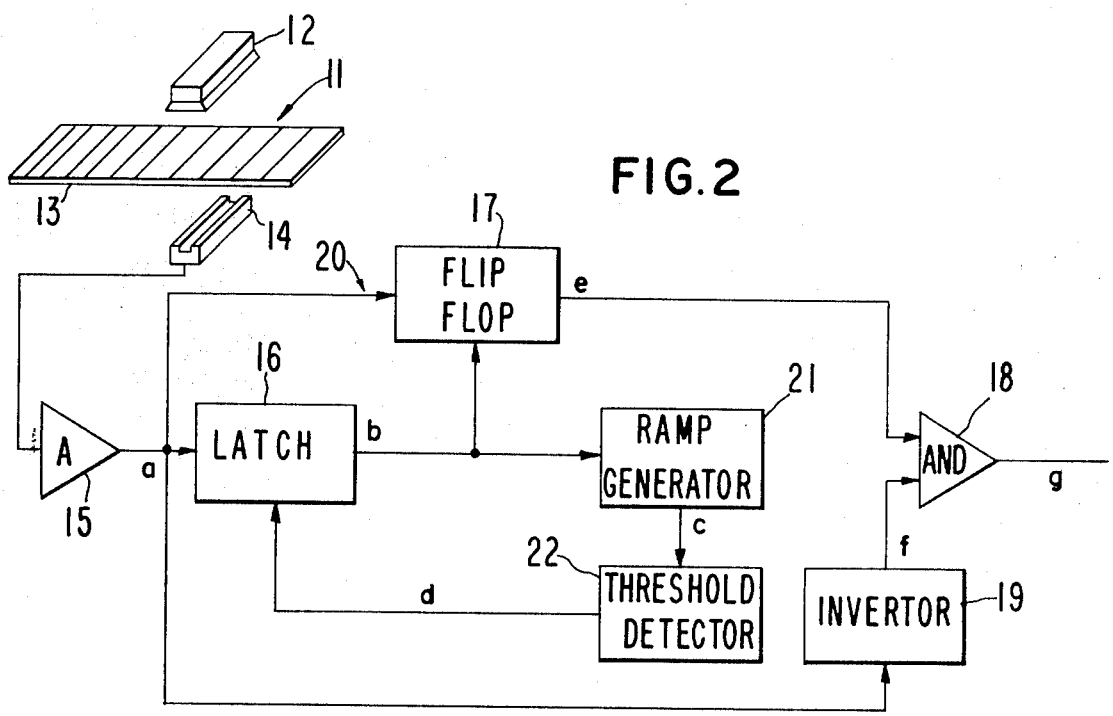
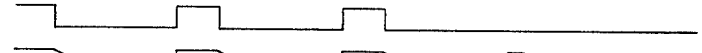
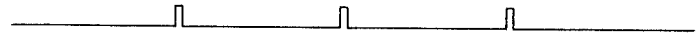
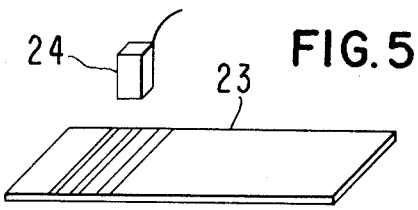

UNSAFE VELOCITY DETECTION SYSTEM

BACKGROUND

It is well known to employ a servo-controlled actuator to position a movable load in random length increments between established limits. In such mechanisms it is necessary to impose a limit on the velocity of the load, particularly when it approaches the established limits of movement, to prevent damage to the mechanism. In the data-processing field such a condition occurs in connection with a disk storage drive which utilizes a servo-controlled linear actuator to position an array of magnetic read/write heads radially of a rotating disk stack. To confine the read/write heads to the usable surfaces of the disk stack, a stop is provided adjacent the inner periphery of the disk to limit the extent of movement of the array. In conventional drives a head array is mounted on a carriage driven by a servo-controlled actuator which accelerates to a maximum velocity and then decelerates at a predetermined rate to bring the read/write heads into a desired position on the disk surfaces in the minimum time. As the extremities of the head movement are approached, the carriage velocity must be limited, since an error could cause the carriage to accelerate into the stop with consequent damage to the mechanism. Therefore, a safety circuit is provided to decelerate the actuator at the maximum rate whenever the limiting velocity is exceeded. Since the limiting velocity decreases as the extremities of movement are approached, circuitry has conventionally been provided to generate a curve which follows the variations in limiting velocity. A counter is then employed to indicate carriage position relative to the stop. This system is referenced to the stop and depends upon the counter to determine carriage position relative to the stop during machine operation. The system therefore depends upon the accuracy and reliability of both the counter and the circuit generating the curve. If an error occurs in one or the other, the safety system will be ineffectual and the potential for damage will be present. The risks in this type system can be reduced by provision of circuitry for double checking the counter output and the curve, but this approach is expensive to implement.

The present invention avoids the shortcomings of the prior known devices by provision of an unsafe velocity detection system for use with a servo-controlled actuator which is dependable and inexpensive and which relies upon direct measurements of the position of the actuated load. This is accomplished by means of a transducer for monitoring movement of the load to produce signals indicating traverse by the load of predetermined increments of the effective working area of the load, means for developing a time-based signal from the traverse signal and means for deriving an unsafe velocity signal from the traverse signal and the time-based signal.

The foregoing and other objects and features and advantages of the invention will be apparent from the following more particular description of a preferred embodiment of the invention as illustrated in the accompanying drawing.

FIG. 1 is an operating curve of velocity versus distance for a typical bang-bang servo with a velocity safety curve in dotted line;

FIG. 2 is a block diagram of an unsafe velocity detection system according to the present invention;

FIG. 3 is a plan view of an optical grating for use with the system of FIG. 2;

FIGS. 4a to 4g are series of waveforms occuring at various points in the circuitry of FIG. 2; and FIG. 5 is an alternative embodiment of a transducer for use with the system of FIG. 2.

As shown in FIG. 1, during a move over a given distance $d$, a typical bang-bang servo accelerates at approximately the maximum rate for the initial half of the distance and then decelerates at approximately the maximum rate over the remaining half of the distance to arrive at the desired position with a minimum of overshoot. Assuming that the largest distance over which the actuator will be moved is that shown, the maximum velocity to which the servo can be accelerated and still be decelerated to a safe velocity within that distance is illustrated by the dotted line curve.

The curve defined by the dotted line is generally parallel to the operating curve for the servo, but is spaced from it by an increment $y$. The velocity $y$ is selected as the maximum velocity at which the movable load can be driven into the stop without causing damage to either the stop or the load. This permits the velocity of the movable load to be increased beyond the operating curve by an amount equal to $y$. However, when the velocity exceeds that defined by the dotted line the servo is automatically reversed and the load decelerated at the maximum rate. The servo then decelerates along the curve defined by the dotted line, so that the load comes into contact with the stops at a velocity which is equal to or less than $y$.

Referring to FIG. 2 the unsafe velocity detection system of the present invention is illustrated as including a position transducer 11 which continuously monitors the position of the movable load and produces indications of movement of the load. The detection system also includes circuitry, shown generally at 20, for developing a time-based signal from the movement indication and means for effecting a time comparison between the movement signal and the time-based signal.

The transducer depicted in FIG. 2 includes a source of energy, such as a light source 12, an elongated mask, such as an optical grating 13, and a sensor 14. The light source and the sensor are aligned with, and spaced slightly from, each other and mounted in a fixed position adjacent to the movable load. The optical grating is operatively secured to the load and supported for longitudinal movement between the light source and the sensor. The signal output of the sensor is connected to an amplifier 15 which is in turn connected to the circuit 20. The output of the amplifier is connected to the input of a latch 16; through a flip-flop 17 to one input of an AND-gate 18; and through an inverter 19 to the other input of the AND gate. The output of the latch is connected to the reset side of the flip-flop 17 and to a ramp generator 21 which is connected through a threshold detector 22 to the reset of the latch.

The optical grating 13 is formed from an elongated strip of dimensionally stable material, such as glass, plastic, etc., which is provided with a series of alternate opaque and translucent areas along one edge of the strip and extending over a distance corresponding to the effective working area of the load. In the case of a disk storage drive the effective working area of the load (i.e., the read/write heads) is the area between the innermost and outermost recording tracks on the disk surfaces. The material of the grating may be translucent with the opaque areas applied by any of a variety of suitable processes, such as plating, etching, printing, photography, etc. Alternatively, the grating may be formed of absorptive material applied to a strip of reflective material, in which case the light source and sensor could be positioned on the same side of the grating. As illustrated in FIG. 3, the widths of the translucent areas are approximately constant over the entire length of the grating, whereas the widths of the opaque areas vary. The opaque areas at the center of the grating are wider than the adjacent translucent areas, but toward the extremities of the grating the opaque areas become progressively narrower until, adjacent the extremities the widths of the opaque areas approximates that of the translucent areas.

Light from source 12 is transmitted through the translucent areas of the grating and received by the sensor 14. The opaque areas of the grating block the transmission of the light to the sensor, so that a discrete signal emanates from the sensor each time a translucent area of the grating passes between the light source and the sensor. The grating is attached to the load, that is, in the case of a disk drive, to the carriage. Therefore, the speed with which each opaque area traverses the space between the light source and the sensor or, to put it another way, the timespan between adjacent signals from the sensor, is a direct measurement of the velocity of the load. With this transducer the allowable velocity curve, depicted in dotted line in FIG. 1, is generated from the opaque and translucent areas on the optical grating. The pattern of opaque areas on the grating is laid out such that the distance between adjacent translucent areas varies directly with the allowable velocity of the load. Thus, when the load is decelerated along the curve the time interval between adjacent translucent areas is constant for any position of the mask and the elapsed time between signals from the sensor can be compared to a single time standard.

The output signal from the sensor 14 drops each time a translucent area permits the transmission of light from the source to the sensor. This signal is amplified in amplifier 15 and appears as a square wave of wave form 4a. In actual practice, the trailing edge of the preceding opaque area is sensed and the signal is then shaped to a standard width by means of a conventional shaper (not shown). The position of the trailing edge of each of the opaque areas is indicated by the lower signal level of the waveform 4a. This position or traverse signal is transmitted to the latch 16, to the flip-flop 17, and to the AND-gate 18. As shown in waveform 4b the latch 16 is set by the leading edge of each of the square waves of waveform 4a, that is, when the signal level of waveform 4a drops, the level waveform 4b likewise drops. When the latch is set, the lower signal level of waveform 4b triggers the ramp generator 21 which times out and then returns to its original condition. The ramp signal, waveform 4c, is transmitted to the threshold detector 22 which senses the point at which the ramp generator times out and emits a signal, waveform 4d. This signal is transmitted to reset the latch 16, thus raising the signal level of waveform 4b. When the position signal of waveform 4a is applied to the flip-flop 17 it sets the flip-flop, that is, when the signal level of waveform 4a is raised it likewise raises the signal level of the flip-flop, waveform 4e. Correspondingly, when the latch 16 is reset by the threshold detector, the raised signal level of waveform 4b resets the flip-flop and drops the signal level thereof, as shown in waveform 4e. The output the flip-flop is then applied as one input to the AND-gate 18. The position signal of waveform 4a is inverted in an inverter 19 to provide waveform 4f which forms the other input to the AND gate. The AND-gate 18 is an AND inverter which provides a negative signal as shown in waveform 4g whenever both inputs are up. As indicated the leading edges of the pulses of wave form 4a indicates the positions of the translucent areas of the optical grating. The ramp generator, as shown in waveform 4c, is selected to have a time period which forms the standard or measurement period for the present system. The ramp generator is triggered by the leading edge of each position pulse and will time out before the occurrence of the next position pulse, as long as the velocity of the load falls below the dotted line of FIG. 1. When, as shown in the fourth pulse of waveform 4a, the load accelerates to a velocity beyond the dotted line of FIG. 1, the position pulse in waveform 4a appears before the ramp generator times out. The situation is reflected in waveform 4e and results in the negative pulse in waveform 4g. The output from the AND gate, waveform 4g, is transmitted to the actuator and causes the actuator to decelerate at its maximum rate.

The transducer construction of FIG. 5 includes a mask 23 supported for linear movement relative to a suitable sensing means 24. The mask 23 is provided with a pattern of spaced indicia or segments similar to that of mask 13 of FIG. 2. The pattern of mask 23 is applied in any suitable manner to be detected by the sensing means 24. For example, the mask may be provided with a magnetizable coating on at least one surface or edge and the pattern magnetically recorded in the coating.

A magnetic read head may be provided as the sensing means for detecting the recorded pattern. Alternatively, the mask may be formed of conductive material and the pattern defined by a series of suitably spaced slots along one edge. In such case the sensing means could then be an eddy current probe or similar device for detecting the pattern.

In the circuitry of FIG. 2 the ramp generator and threshold detector are illustrative of a suitable timing means for applications with precise timing requirements. In other applications less precise devices, such as a single shot, etc., may be employed to establish the time standard where precision is not required.

Obviously, many modifications and variations of the present invention are possible in light of the above teachings. It is therefore to be understood that within the scope of the appended claims, the invention may be practiced otherwise than as specifically described.

What is claimed is:

1. In a servo-controlled system for driving and positioning a load movable over an effective working distance,
   A. a transducer for monitoring movement of said load comprising:
      1. a sensor;
      2. an elongated mask secured to said load for linear movement relative to said sensor;
         a. said mask having a pattern of alternating sensor-affecting segments spaced thereon over a distance corresponding to said effective working distance of said load movement;
         b. said pattern of alternating sensor-affecting segments having widths that vary over the length of said mask so that as said load is driven over said effective working distance, said transducer generates a traverse signal indicative of the position and velocity of said load;
   B. Means responsive to said traverse signal for developing a time-based signal comprising:
      1. a time-base signal generator;
      2. latch circuit means responsive to said traverse signal for initiating signal generation by said time-base signal generator; and
      3. threshold detection means for sensing when said time-base generator output reaches a predetermined output level; and
   C. Logic means for comparing said traverse signal with said time-base signal to detect when said load velocity at a particular load position exceeds predetermined velocity limits for that particular position.

2. In the servo-controlled system of claim 1 wherein said sensor-affecting segments decrease in width progressively from the center of said elongated mask to each end thereof so that said mask has a symmetrical pattern of variable-width segments thereon; and said widths of said segments vary in direct relation to the maximum allowable velocity of said load over said effective working distance.

3. In the servo-controlled system of claim 1 wherein said alternating sensor-affecting segments comprise opaque and translucent segments which cooperate with a light source to generate a signal in said light sensor.

4. In the servo-controlled system of claim 1 wherein said alternating sensor-affecting segments are light reflecting and absorbing segments which cooperate with a light source to generate a signal in said sensor.

* * * * *